(12) United States Patent
Hanson

(10) Patent No.: US 10,524,481 B2
(45) Date of Patent: Jan. 7, 2020

(54) CARCASS CLEANING TOOL

(71) Applicant: Jarvis Products Corporation, Middletown, CT (US)

(72) Inventor: Gregory Hanson, Omaha, NE (US)

(73) Assignee: JARVIS PRODUCTS CORPORATION, Middletown, CT (US)

(*) Notice: Subject to any disclaimer, the term of this patent is extended or adjusted under 35 U.S.C. 154(b) by 158 days.

(21) Appl. No.: 15/857,773

(22) Filed: Dec. 29, 2017

(65) Prior Publication Data

US 2018/0310571 A1 Nov. 1, 2018

Related U.S. Application Data

(60) Provisional application No. 62/492,354, filed on May 1, 2017.

(51) Int. Cl.
*A22B 5/00* (2006.01)

(52) U.S. Cl.
CPC .......... *A22B 5/0041* (2013.01); *A22B 5/0005* (2013.01); *A22B 5/0082* (2013.01)

(58) Field of Classification Search
CPC .......... A22B 5/00; A22B 5/0017; A22B 5/16; A22B 5/161; A22B 5/163
USPC ................ 452/198, 125, 127–129, 132, 133
See application file for complete search history.

(56) References Cited

U.S. PATENT DOCUMENTS

| | | | | |
|---|---|---|---|---|
| 4,021,883 A | * | 5/1977 | Schmidt, Jr. | A22B 5/161 452/128 |
| 4,417,367 A | * | 11/1983 | Leining | A22B 5/16 452/129 |
| 4,438,546 A | * | 3/1984 | Couture | A22B 5/161 452/128 |
| 4,653,149 A | * | 3/1987 | Swilley | A22B 5/161 452/129 |
| 5,087,222 A | * | 2/1992 | Sterling | A22B 5/161 452/127 |
| 5,785,588 A | * | 7/1998 | Jacobs | A22B 5/0005 452/129 |
| 5,997,393 A | * | 12/1999 | Tornberg | A22B 5/161 452/129 |

* cited by examiner

Primary Examiner — Richard T Price, Jr.
(74) Attorney, Agent, or Firm — DeLio Peterson & Curcio LLC; Peter W. Peterson

(57) ABSTRACT

A carcass cleaning tool for removing dag from a suspended carcass has a body with at least one handle mounted to it for allowing an operator to hold the tool away from them. A driver is mounted in the body and rotates a head having a shaft extending therefrom. A plurality of arms extend from the shaft and have tines at distal ends, the tines adapted to engage the animal carcass to remove dag from the carcass hide. The head is oriented to permit movement of the arms and tines in front of the tool operator. A suspension point for hanging the body from an overhead support permits the operator to move the tool arms and tines toward and away from the carcass to remove the dag without damaging the carcass hide. The tool body never makes contact with the ground as a result of using the suspension point.

25 Claims, 15 Drawing Sheets

CARCASS CLEANING TOOL

BACKGROUND OF THE INVENTION

1. Field of the Invention

The present invention relates to tools for removing dried manure and other debris from animal carcasses prior to meat processing.

2. Description of Related Art

In processing meat from beef cattle carcasses, the carcasses are opened to remove internal components, and then split down the center of the spine or backbone into two sides, which are subsequently further processed into meat cuts. Meat processing facilities operate on beef carcasses that continuously move along an overhead carcass rail. Each carcass is suspended, typically from its hind legs, from a pair of trolleys that ride along the overhead carcass rail or track. Prior to opening the beef carcass, it must be cleaned to remove dried manure and other debris, referred to herein as "dag," which may be present on various sides, particularly the underside, of the beef carcass.

SUMMARY OF THE INVENTION

Bearing in mind the problems and deficiencies of the prior art, it is therefore an object of the present invention to provide a tool and method for cleaning solid debris, including dag, from animal carcasses, particularly beef carcasses.

Still other objects and advantages of the invention will in part be obvious and will in part be apparent from the specification.

The above and other objects, which will be apparent to those skilled in the art, are achieved in the present invention which is directed to a tool for removing solid debris from an animal carcass, comprising a body, at least one handle mounted to the body allowing the tool to be held away from a tool operator, a driver mounted in the body, a head having a shaft extending therefrom and rotatable by the driver, a plurality of arms extending from the shaft, and a suspension point for hanging the body from an overhead support. The plurality of arms have tines at distal ends thereof, the tines adapted to engage the animal carcass to remove solid debris from the hide, the head being oriented to permit movement of the arms and tines in front of the tool operator. The suspension point permits the operator to move the tool arms and tines toward and away from, and over different areas of, the animal carcass to remove solid debris therefrom without damaging the carcass hide.

In an embodiment, the tool further includes a shield at least partially surrounding the plurality of arms, the shield protecting the operator from impact with flying solid debris during engagement of the animal carcass with the tool arms and tines. The arms may extend radially outwardly from the shaft, and the tines are disposed substantially normal to the arms and parallel to the shaft. The arms may include tine supports of one piece with the arms extending substantially normal thereto at the arm distal ends, and wherein the tines are secured to the tine supports. The tines may further have opposite edges. The tines may also be secured to the tine supports by a removable fastener, and are replaceable. The tines may still further have opposite edges and are removable from the arms, such that a tine on one arm may be removed and rotated and placed on another arm with the edges in opposite position.

In a further embodiment, the at least one handle has a trigger, such that depressing the trigger activates the driver and rotates the head. The plurality of handles may be mounted to the body, and each handle has a trigger such that simultaneously depressing each trigger activates the driver and rotates the head.

In another aspect, the present invention is directed to a method of removing solid debris from an animal carcass. The method provides a tool having a body, a driver mounted in the body, a head having a shaft extending therefrom and rotatable by the driver, a plurality of arms extending from the shaft and having tines at distal ends thereof, and a suspension point for hanging the body from an overhead support. The tool body has at least one handle having a trigger mounted to it, which allows the tool to be held away from a tool operator. The tines are adapted to engage the animal carcass to remove solid debris from the hide, the head being oriented to permit movement of the arms and tines in front of the tool operator. The suspension point permits the operator to move the tool arms and tines toward and away from, and over different areas of, the animal carcass to remove solid debris therefrom without damaging the carcass hide. The method includes the steps of suspending the tool by the suspension point from an overhead support, grasping the handle by the operator and holding the tool away from the front of the operator, depressing the trigger to commence rotation of the arms and tines, and moving the tool arms and tines toward and away from, and over different areas of the animal carcass, such that the rotating tines contact the hide of the animal carcass to remove solid debris therefrom without damaging thereto.

In an embodiment, the method includes the arms extending radially outwardly from the shaft and the tines are disposed substantially normal to the arms and parallel to the shaft. The arms may include tine supports of one piece with the arms extending substantially normal thereto at the arm distal ends, and wherein the tines are secured to the tines supports. The tines may have opposite edges and are replaceable. The tines may further have symmetric opposite edges and are removable from the arms, such that a tine on one arm may be removed and rotated and placed on another arm with the edges in opposite position. The tool may not contact the ground during use in cleaning of the animal carcass. A plurality of handles each having a trigger may also be mounted to the body, which further includes depressing each trigger simultaneously to activate the driver and rotate the head.

In a further aspect, the present invention is directed to a system for removing solid debris from an animal carcass, comprising a cleaning station, a tool having a body, at least one handle mounted to the body, a driver mounted in the body, a head having a shaft extending therefrom and rotatable by the driver, a plurality of arms extending from the shaft and having tines at distal ends thereof, and a suspension point for hanging the body from an overhead support. The cleaning station has a pair of rails on which rides a trolley for suspending an animal carcass. The at least one handle mounted on the body allows the tool to be held away from a tool operator. The tines on the plurality of arms are adapted to engage the animal carcass to remove solid debris from the hide, the head being oriented to permit movement of the arms and tines in front of the tool operator. The suspension point permits the operator to move the tool arms and tines toward and away from, and over different areas of, the animal carcass to remove solid debris therefrom without damaging the carcass hide. The operator may move the tool arms and tines toward the carcass suspended on the trolley as the trolley and carcass rides along the rails, the rotating head moving the arms and tines in an arc to make contact with and remove solid debris from the carcass, and the operator may move the tool arms and tines away from the carcass once the solid debris are removed from the carcass.

In an embodiment, the system may further include a shield at least partially surrounding the plurality of arms, the shield being capable of protecting the operator from impact with flying solid debris during engagement of the animal carcass with the tool arms and tines. The arms may extend radially outwardly from the shaft and the tines are disposed substantially normal to the arms and parallel to the shaft. The arms may further include tine supports of one piece with the arms extending substantially normal thereto at the arm distal ends, and wherein the tines are secured to the tine supports. The tines may also have opposite edges and be replaceable. They may further have symmetric opposite edges and be removable from the arms, such that a tine on one arm may be removed and rotated and placed on another arm with the edges in opposite position.

Still further, the tool may not contact the ground during use in cleaning of the animal carcass. The at least one handle may have a trigger, such that depressing the trigger activates the driver and rotates the head. A plurality of handles may be mounted to the body, each handle having a trigger such that simultaneously depressing each trigger activates the driver and rotates the head.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment(s) of the present invention, reference will be made herein to FIGS. 1-15 of the drawings in which like numerals refer to like features of the invention.

Figure 1:
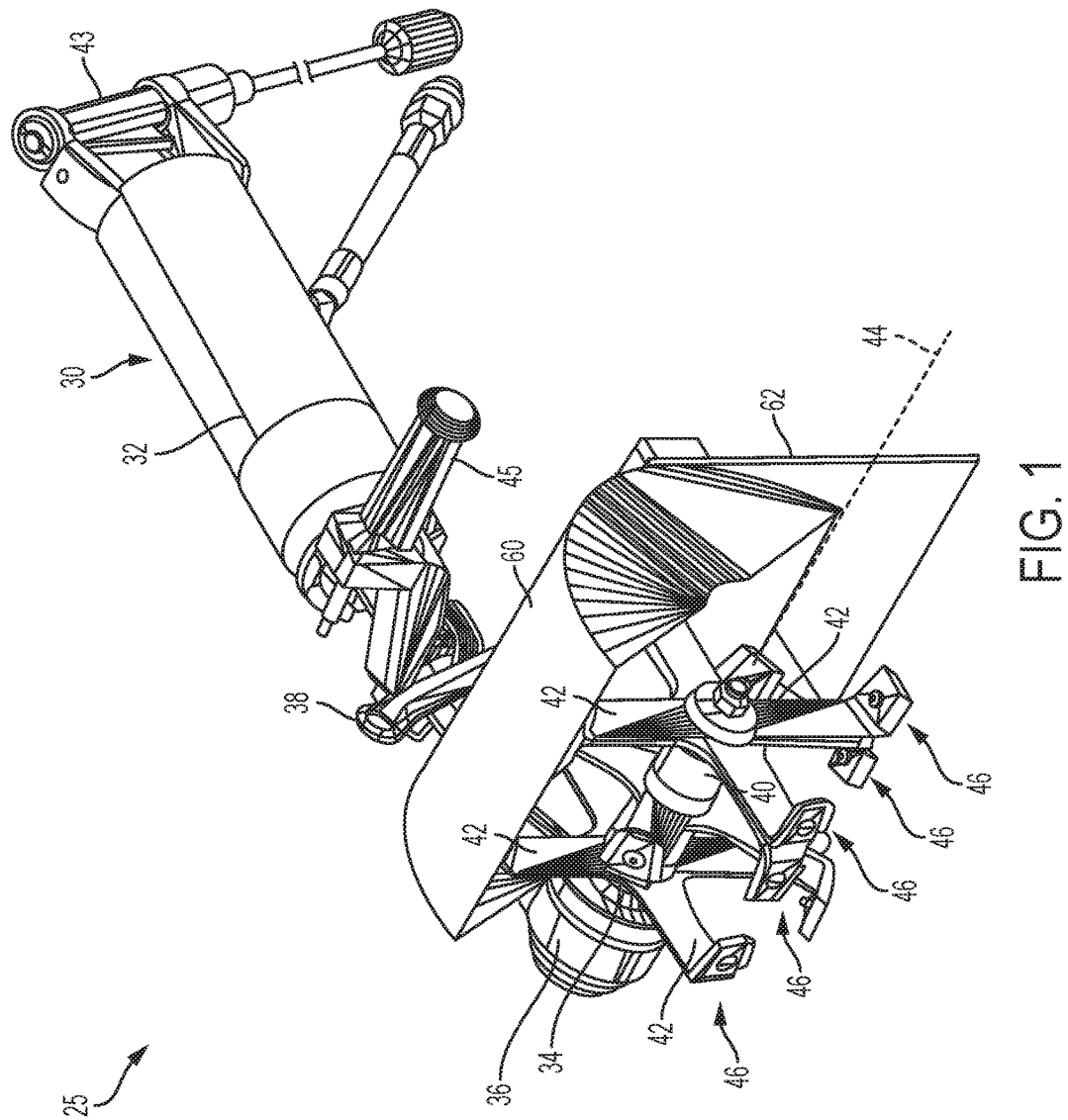
FIG. 1 is a perspective view of an embodiment of the carcass debris removal tool of the present invention.
Figure 2:
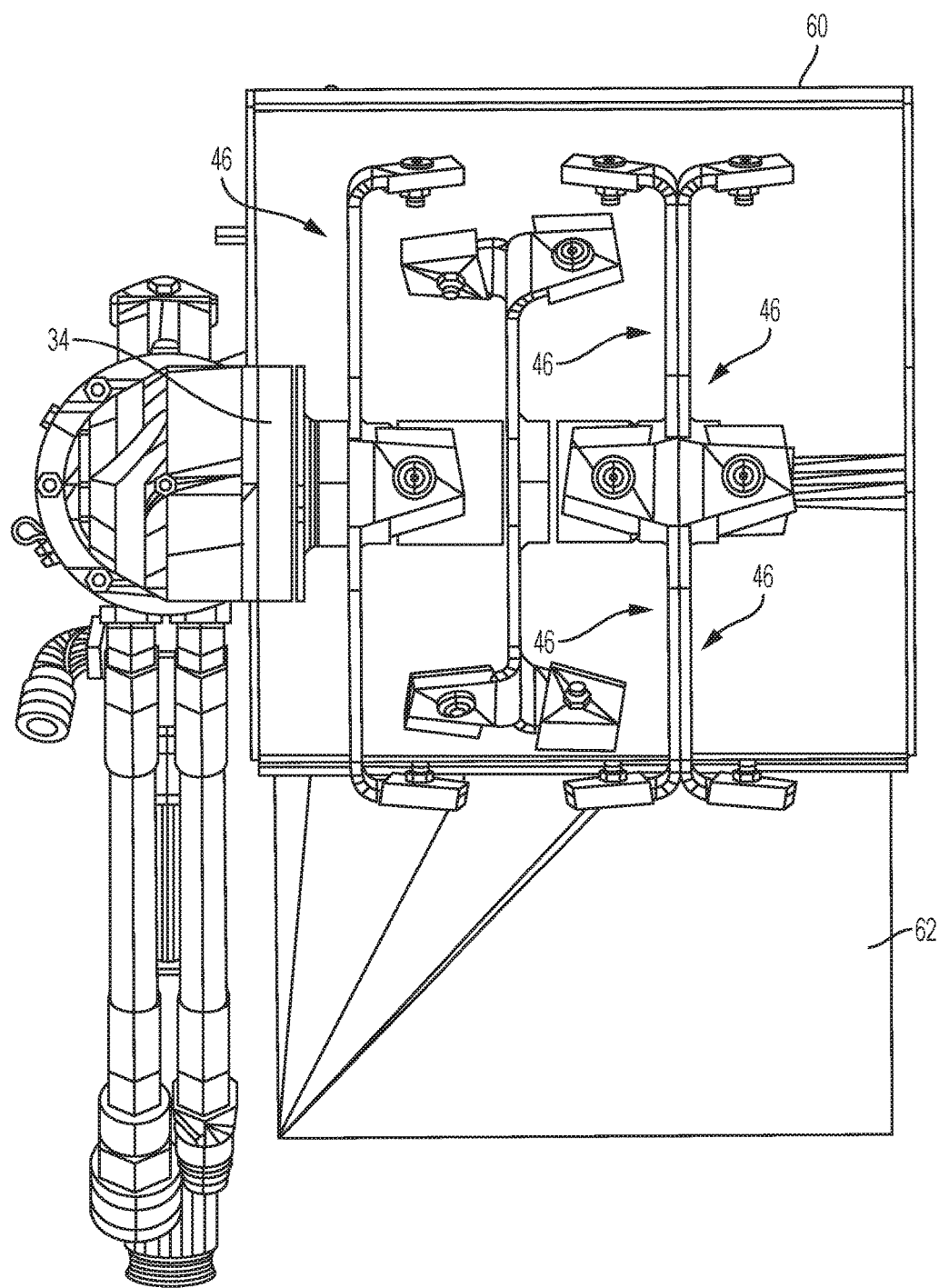
FIG. 2 is a front elevational view of the carcass debris removal tool of FIG. 1.

As shown in FIG. 1, the dag remover tool 25 of the present invention includes a body 30 incorporating a driver 32, which may comprise a reversible hydraulic motor that operates a rotating head 34 through a right angle gear unit 36. The weight of the tool is preferably suspended from suspension point 38 which may be adjusted with respect to body 30 to adjust the balance. The tool is manipulated manually and positioned by grasping handles 43 and 45. One or both of the rear handle 43 and front handle 45 is provided with a trigger 28 (wired in series if on both) to activate driver 32 and rotate head 34.

A controller (not shown) is connected to the trigger(s) and to the driver. The controller operates the driver to begin rotating the head in a forward or reverse direction when the trigger is actuated. The controller stops the drive and the head rotation after the trigger is released.

Extending in a cantilever fashion from head 34 in a direction normal to the axis of tool body 30 is shaft 40. Driven shaft 40 has extending radially outwardly therefrom at 90° to the shaft axis 44 a plurality of spaced arms 42 having at their distal ends one or more tines 50. The arms may be made in arm units 46 in the embodiment shown in the drawings (FIGS. 2-4), which each arm unit having four arms 42 extending at 90° intervals, and tine supports 48 extending in the same direction from the distal ends of each of the arms 42. More or fewer arms may be employed on each arm unit. The arm units may be arranged singly on shaft 40, as is the arm unit closest to head 34, or in back-to-back pairs with tine supports 48 extending in the opposite direction, as are the arms units farthest from head 34. A single arm unit may also have the tine supports extending in opposite directions on alternate arms, as is the middle arm unit on shaft 40. The arms of the arm units may be aligned with each other as seen in a view along axis 44, as are the first and last arm units, or may be aligned at different angles with respect to each other, as is the middle arm unit aligned at 45° with respect to the other arm units. This presents at least one tine against the animal hide for every 45° rotation of the shaft. The different alignments of the arms in the different arm units permit different sequences of striking of the tines against the carcass sides.

Figure 3:
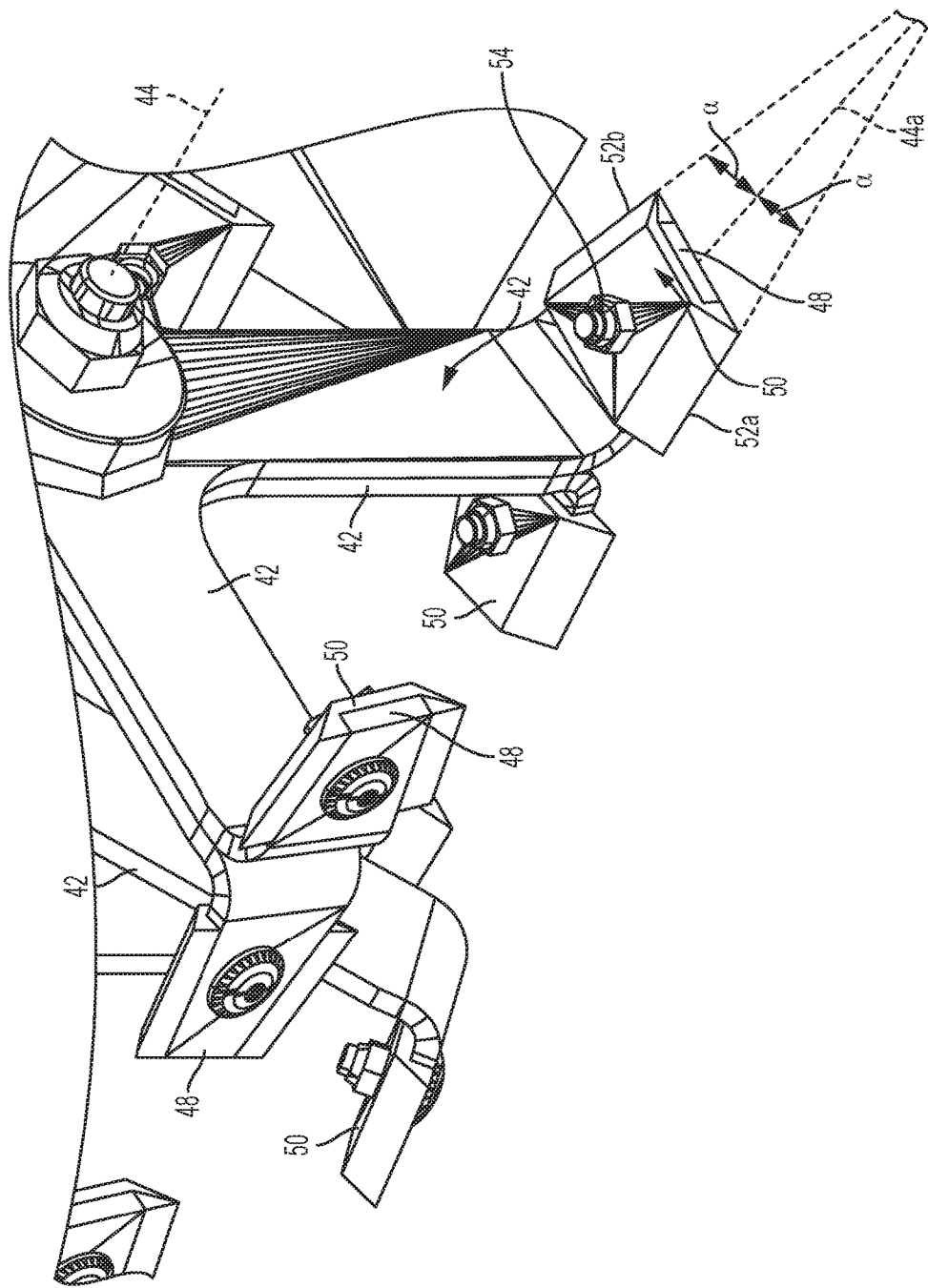
FIG. 3 is a close-up perspective view of the arms and tines of the carcass debris removal tool of FIG. 1.

The tine supports 48 at the ends of arms 42 may have tines 50 either integrally formed of one piece with the tine support, or as a separate piece secured to the tine support, as shown in the embodiment (FIG. 3). Each tine 50 has a body extending generally in a plane disposed parallel to shaft axis 44, with opposite facing straight edges 54a, 54b. Each edge 54a, 54b is shown oriented at an acute angle α to the line 44a intersection of tine 50 and a plane containing shaft axis 44. Other edge orientations may be used.

The tine supports 48 are generally in the configuration of flat isosceles trapezoids (though they may be configured as other shapes), and the tines as shown have the body disposed along the inside tine support face (with respect to axis 44), and the edges 52a, 52b along flanges that extend downward from the tine body around the sides of the tine supports so that the tine edges are coplanar with the outside surfaces of the tine supports (FIG. 3). A removable fastener such as, but not limited to, a nut-and-bolt 54 extends through an opening normal to the tine support and tine body to secure the two. The tines 50 are symmetric in construction and are replaceable and reversible to present the edges in an opposite position, so that if the edge 52a of one becomes worn, it may be swapped with another tine which has an unused sharp edge 52b. The edge itself has upper and lower sides meeting at an acute angle.

Figure 4:
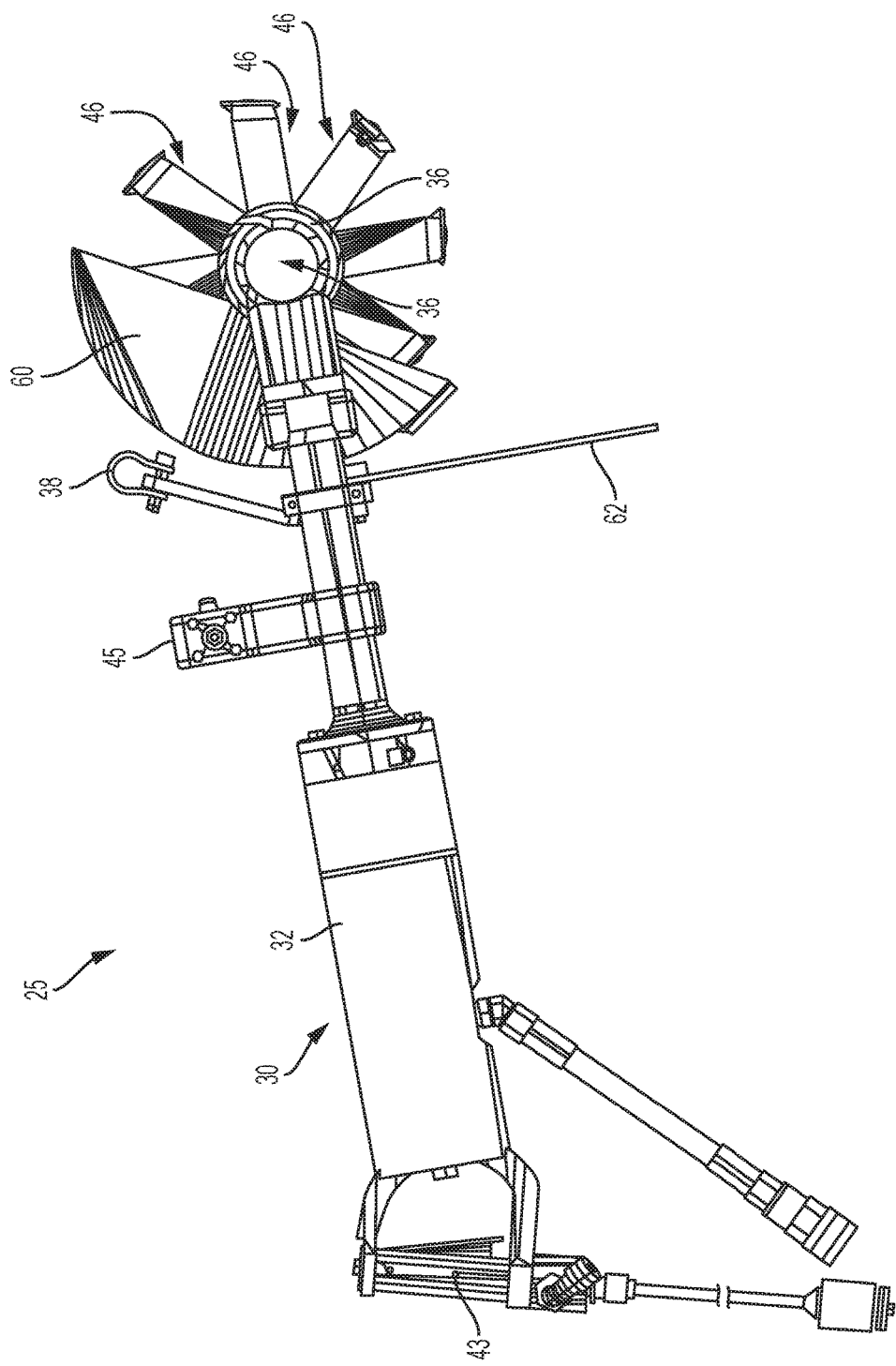
FIG. 4 is a left side elevational view of the carcass debris removal tool of FIG. 1.
Figure 5:
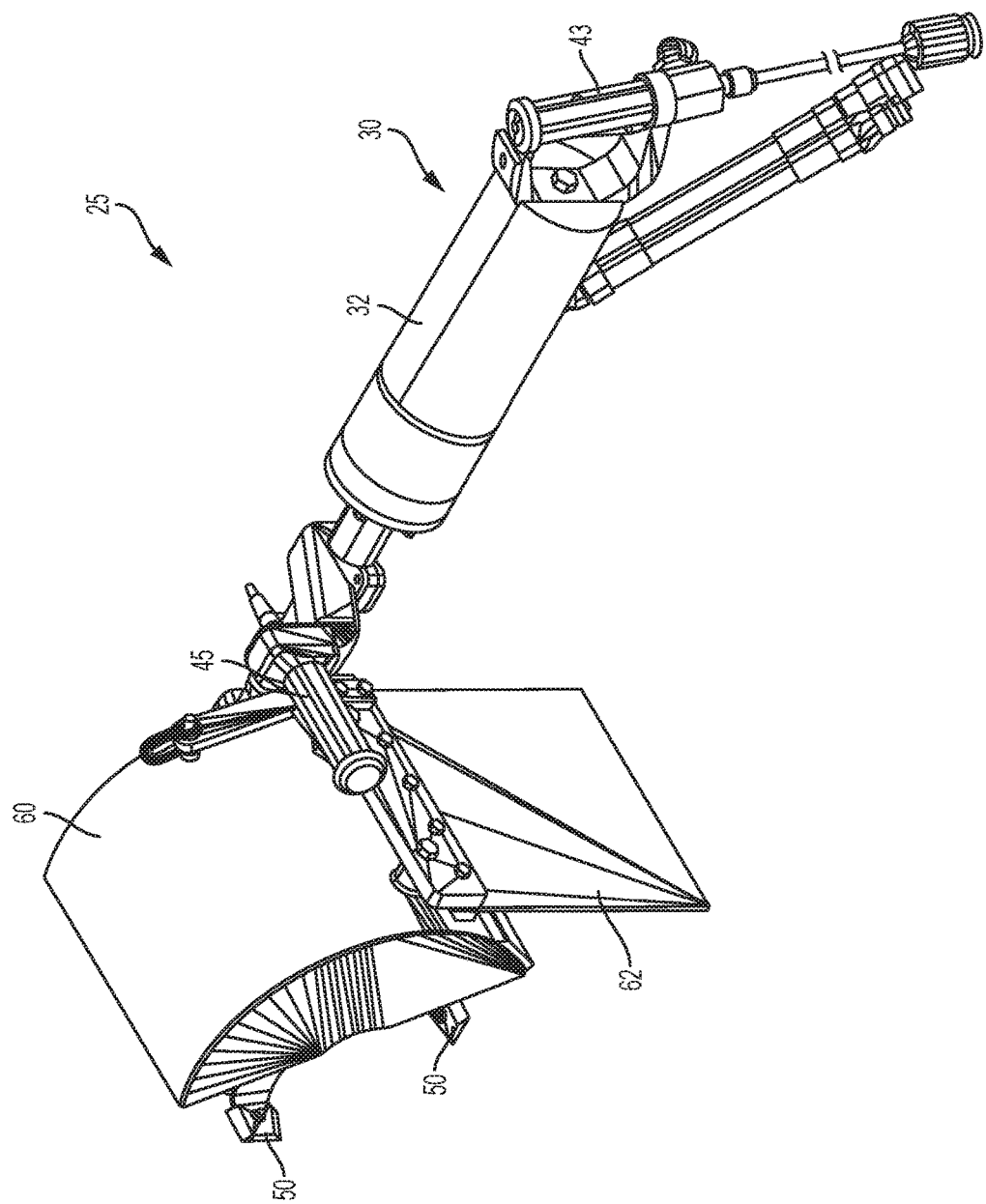
FIG. 5 is a rear perspective view of the carcass debris removal tool of FIG. 1.
Figure 6:
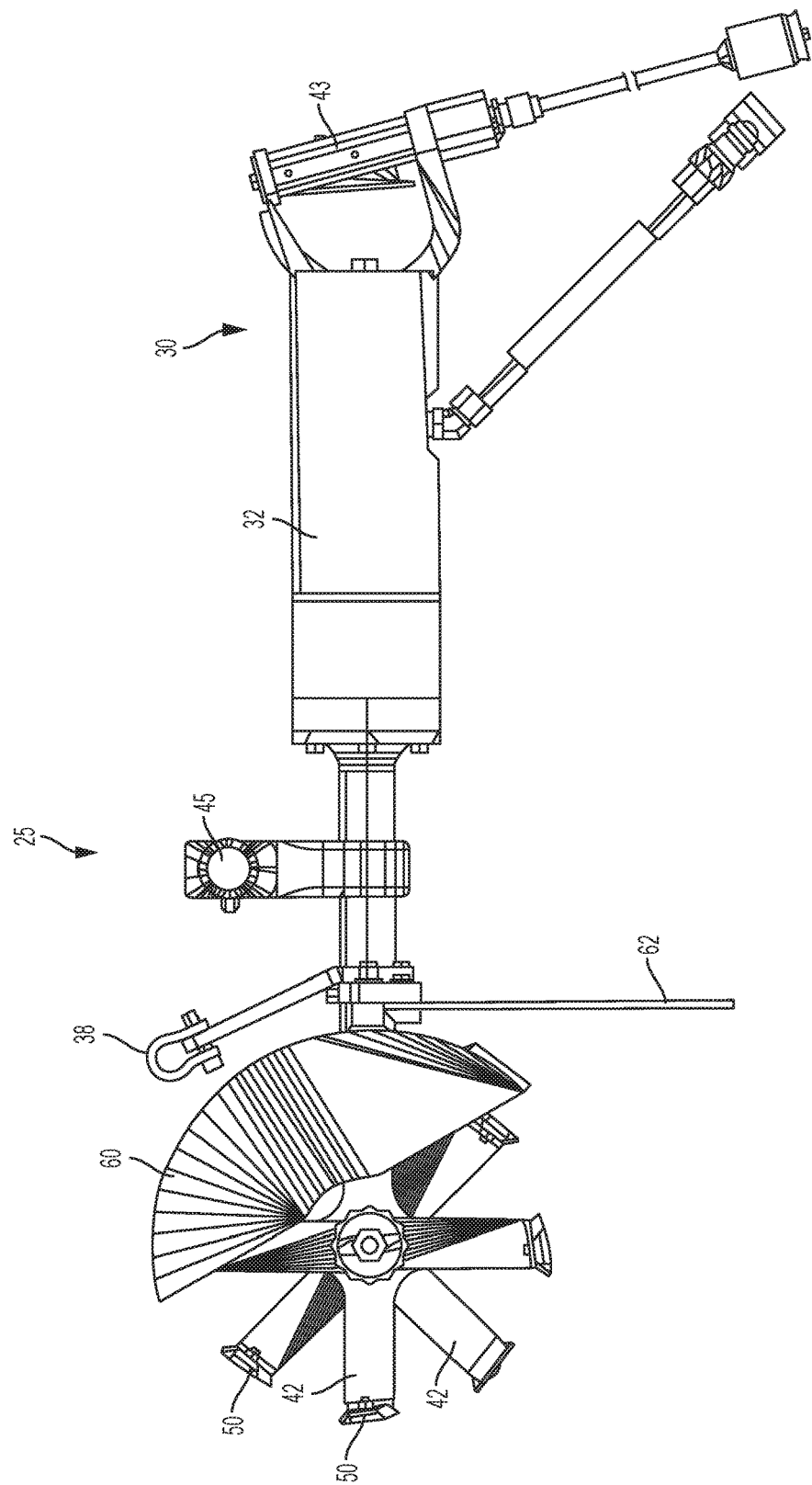
FIG. 6 is a right side elevational view of the carcass debris removal tool of FIG. 1.
Figure 7:
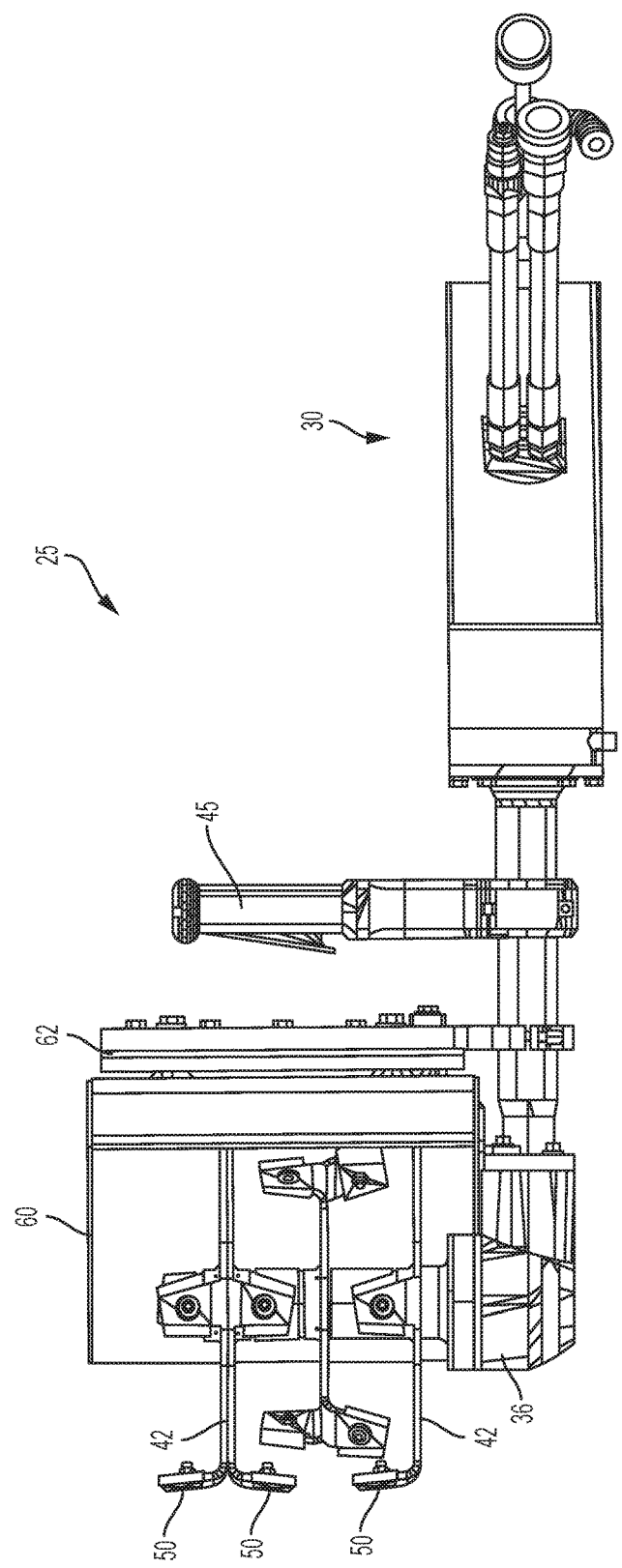
FIG. 7 is a bottom plan view of the carcass debris removal tool of FIG. 1.
Figure 8:
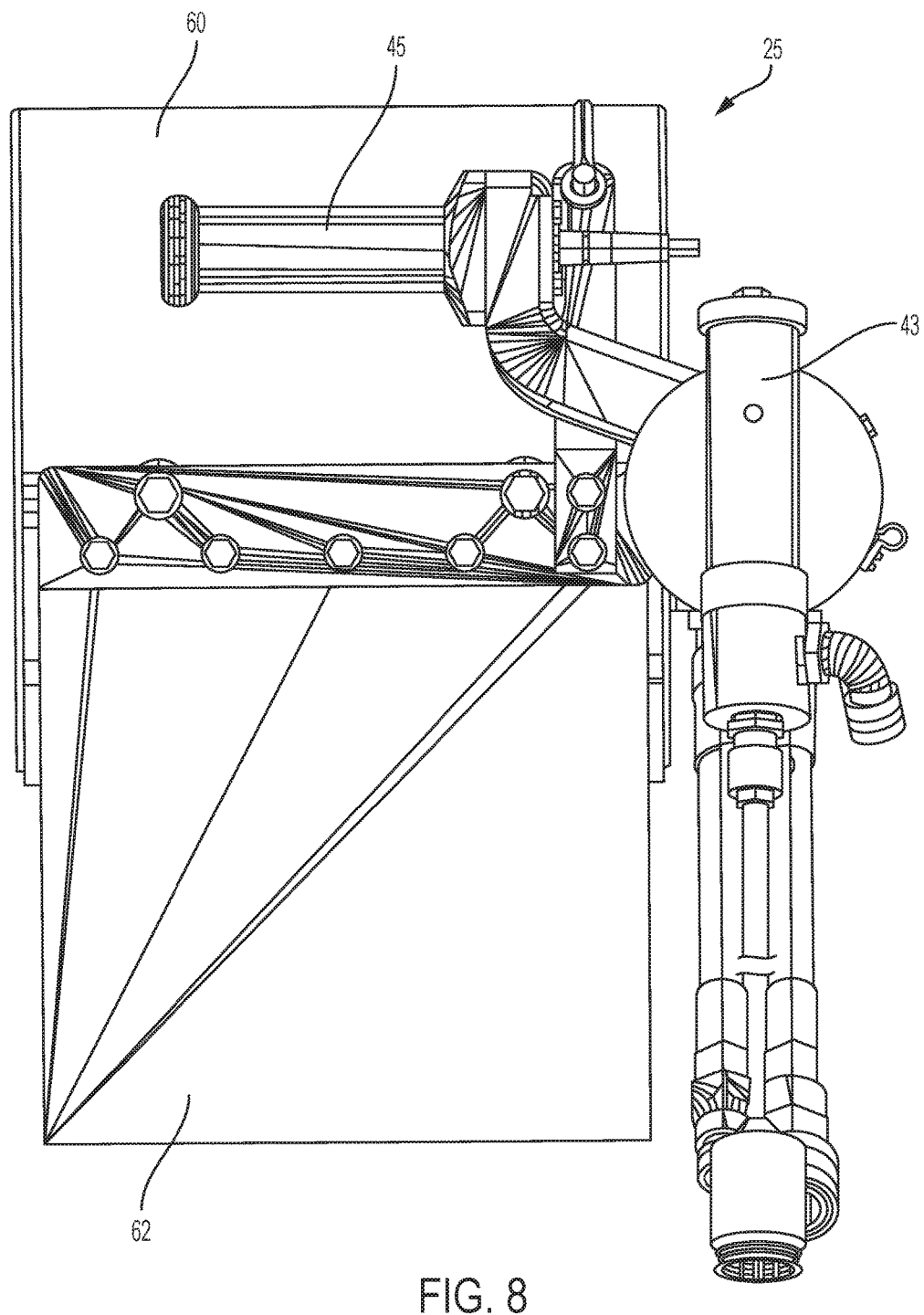
FIG. 8 is a rear elevational view of the carcass debris removal tool of FIG. 1.
Figure 9:
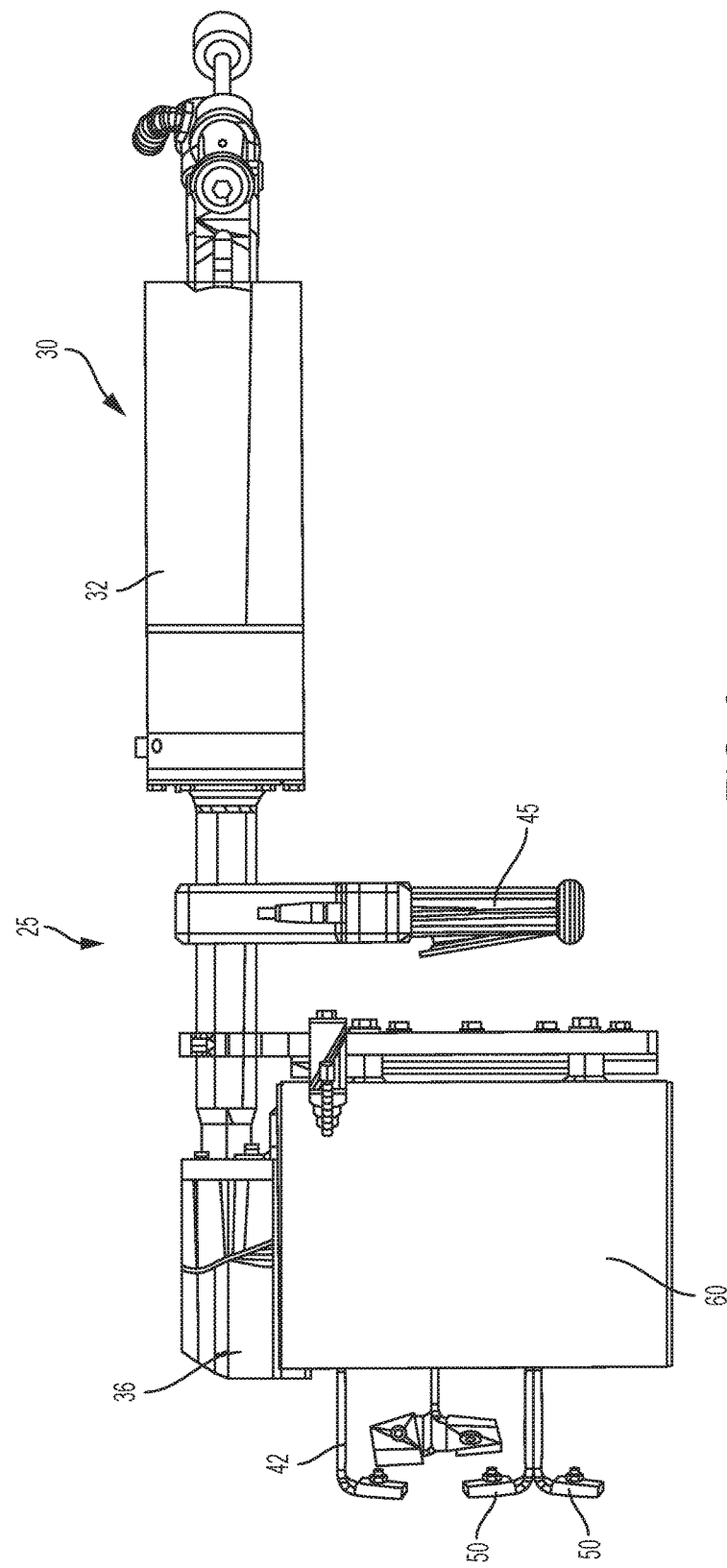
FIG. 9 is a top plan view of the carcass debris removal tool of FIG. 1.
Figure 10:
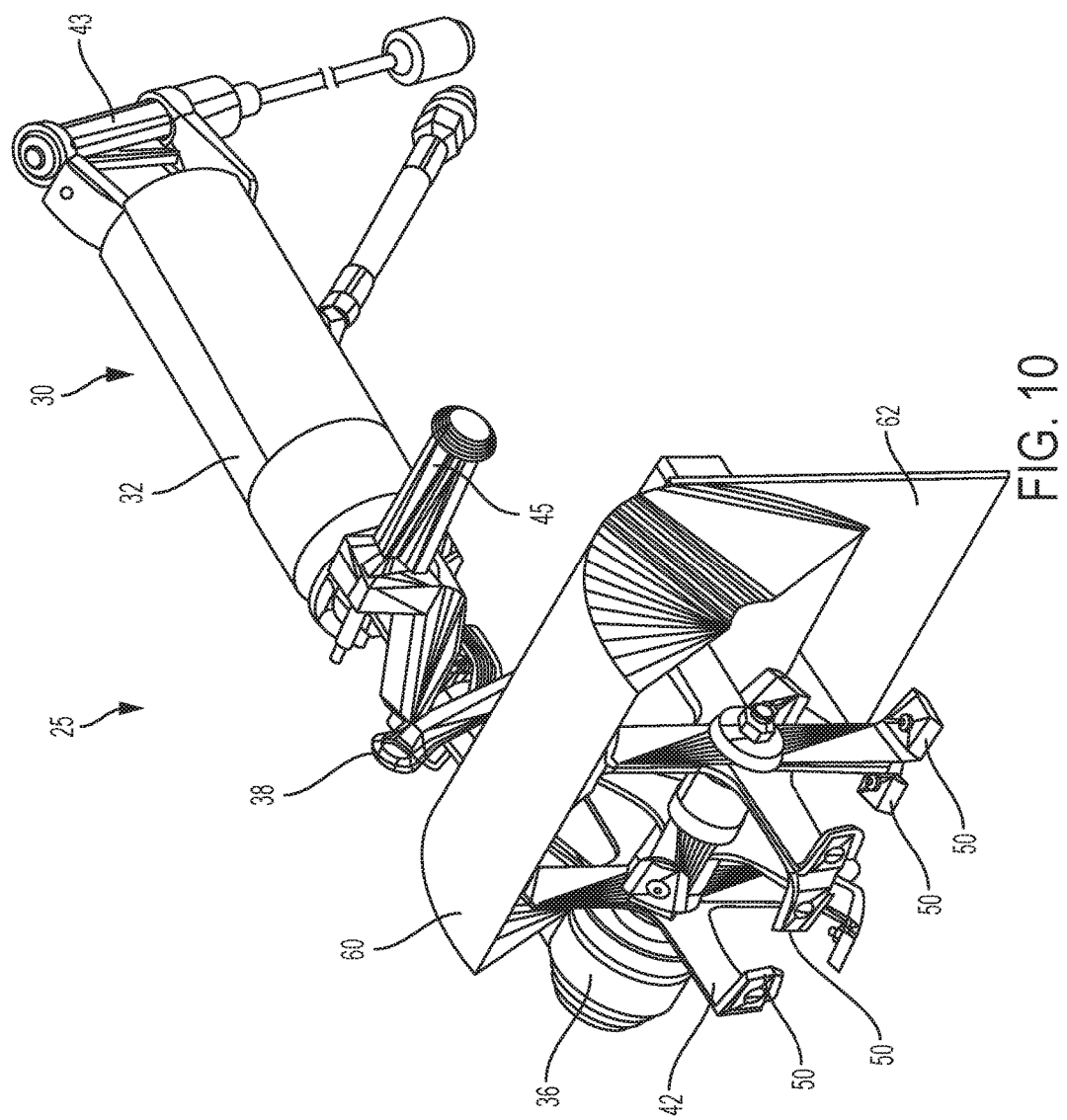
FIG. 10 is another front perspective view of the carcass debris removal tool of FIG. 1.
Figure 11:
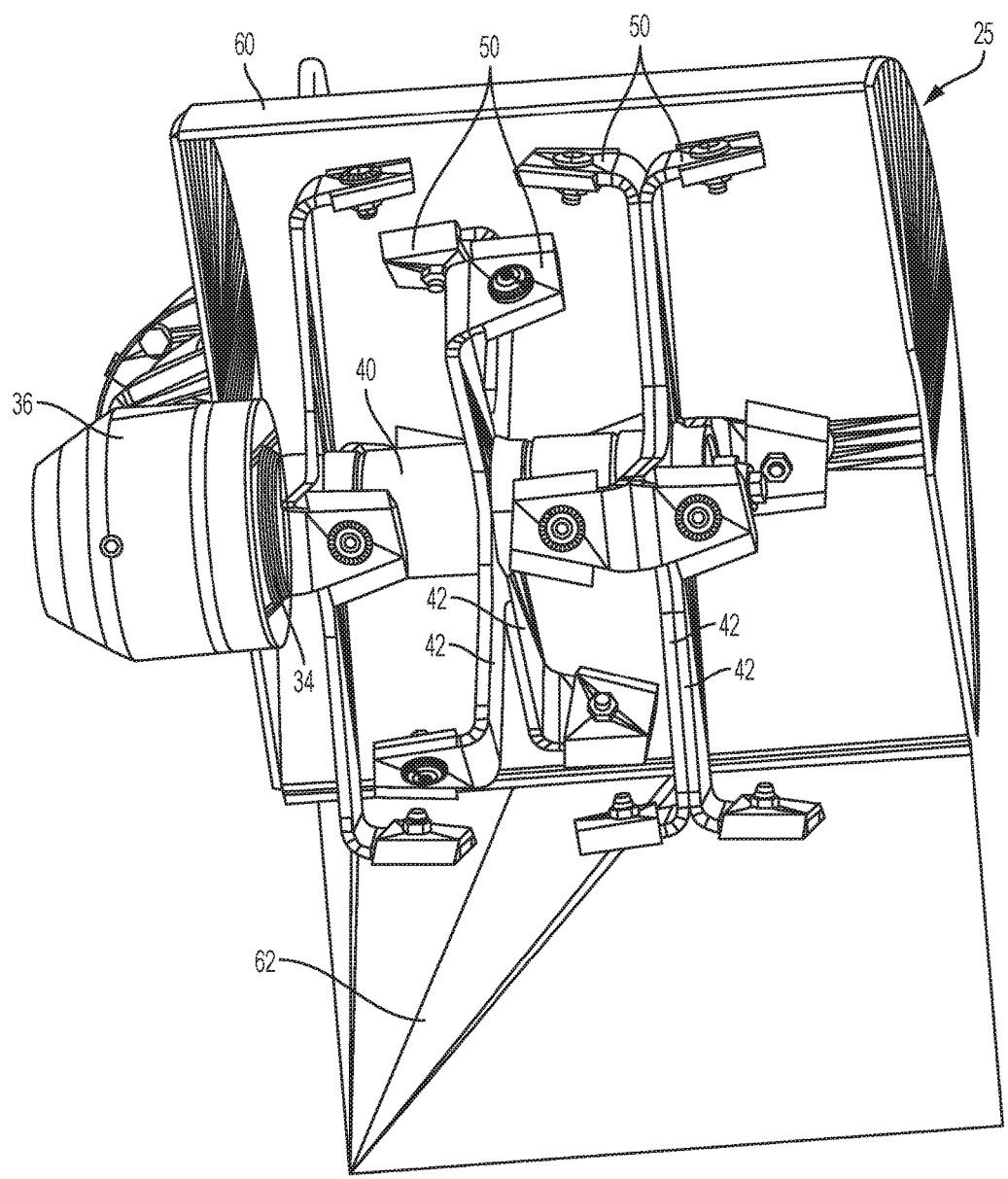
FIG. 11 is a close-up front elevational view of the gear unit, arms, tines, and shield of the carcass debris removal tool of FIG. 1.
Figure 12:
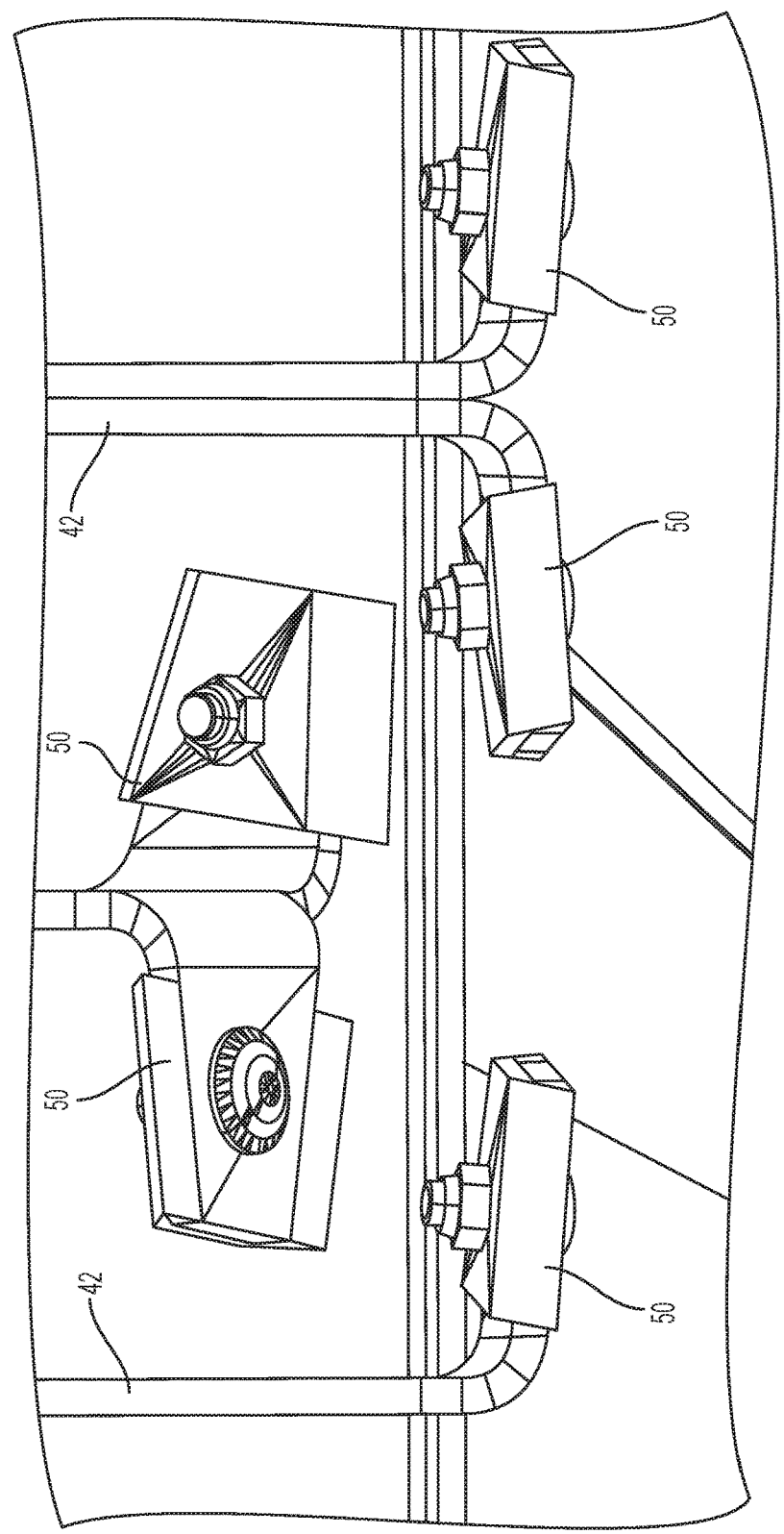
FIG. 12 is a close up perspective view of the arms and tines of FIG. 3.

As shown in FIGS. 4-6, semi-cylindrical shield 60 surrounds one-half of the rotating arm units 46, and includes a guard 62 extending tangentially down from the rear portion of shield 60. The shield and guard protect the operator from any loose dag material which may be flung off the head as it rotates.

Figure 13:
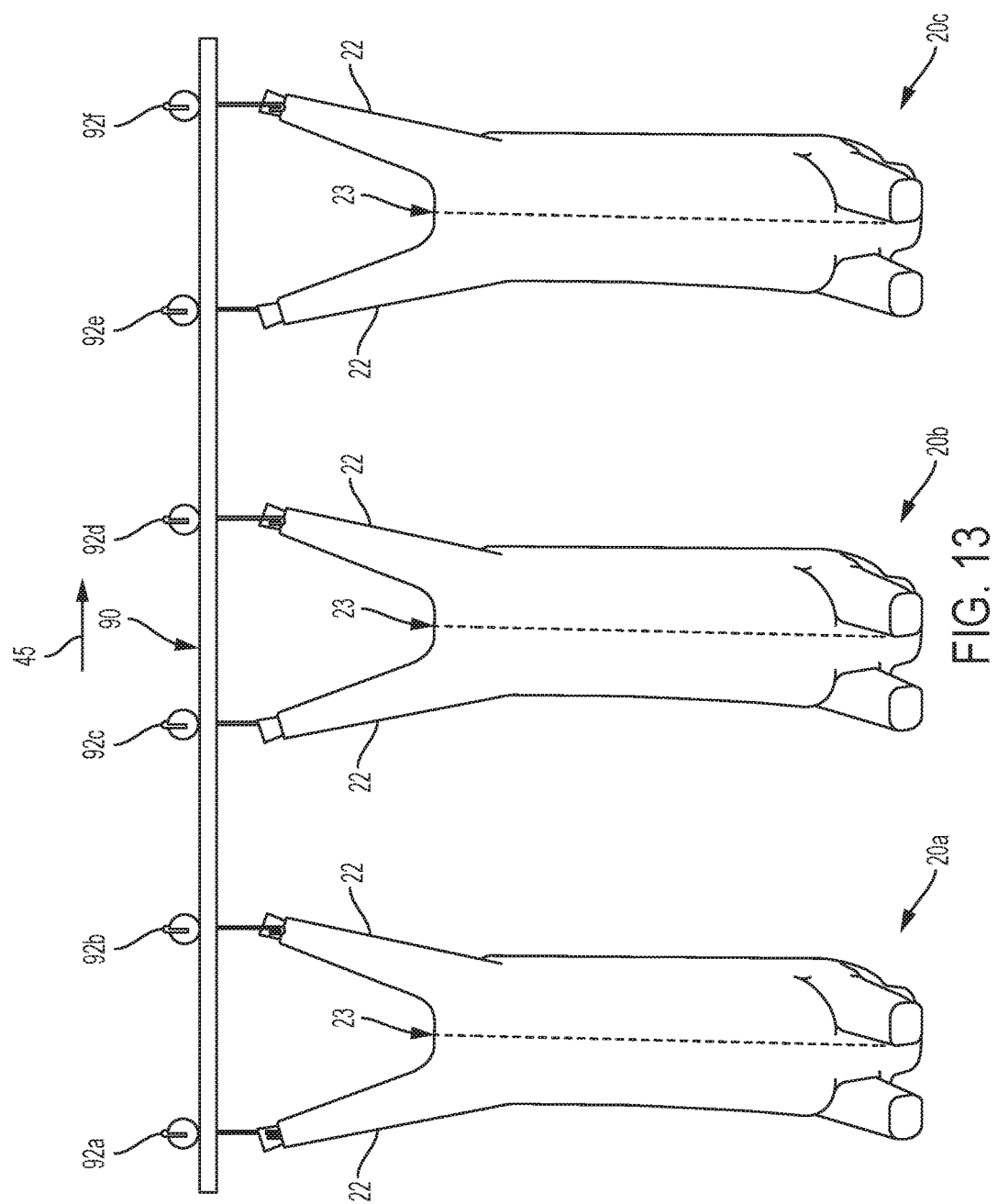
FIG. 13 is a side elevational view of animal carcasses suspended from a trolley system for cleaning with the carcass debris removal tool of the present invention.
Figure 14:
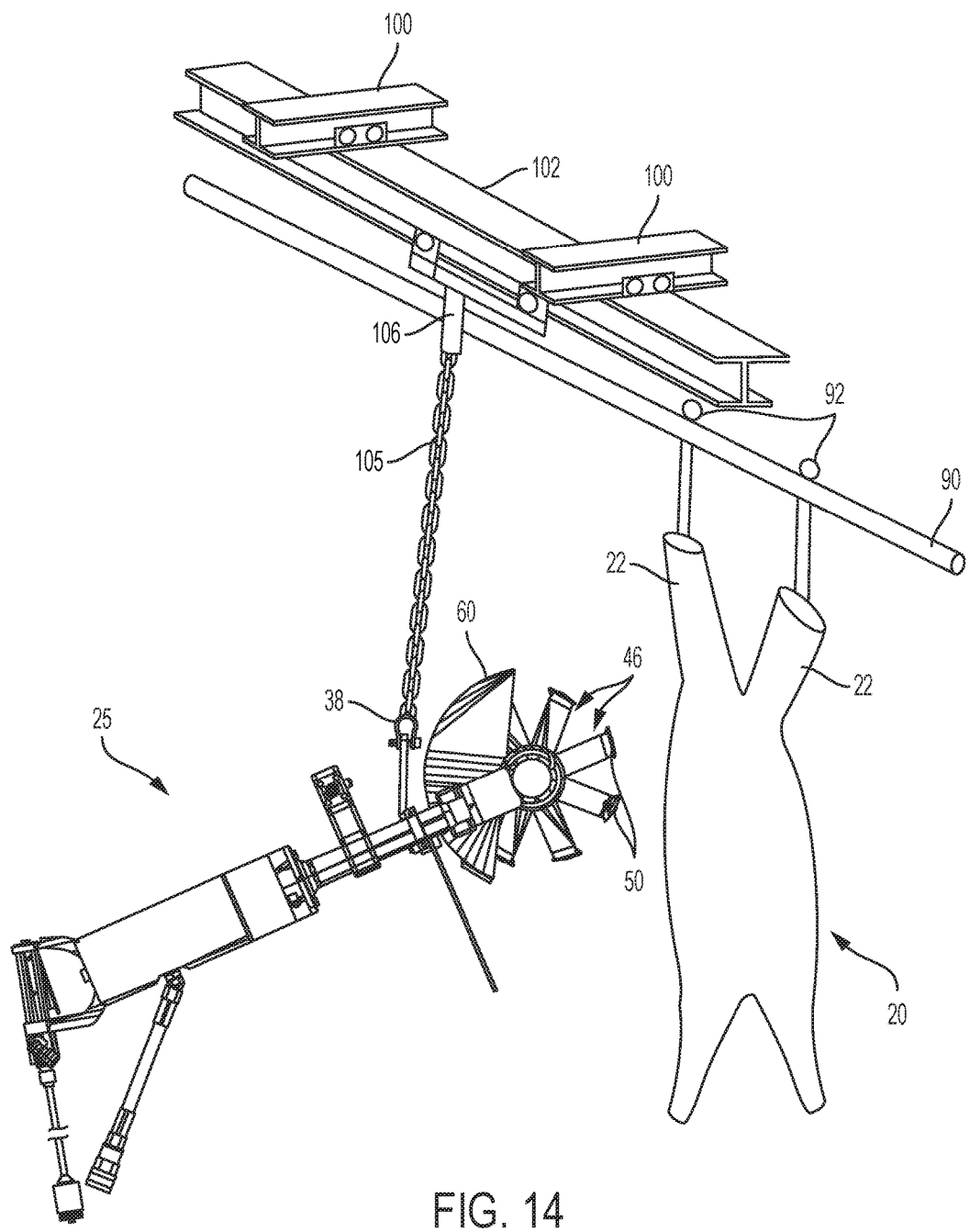
FIG. 14 is a perspective view of a cleaning station with the carcass debris removal tool of FIG. 1 cleaning an animal carcass, and with both the tool and carcass being suspended by trolleys.
Figure 15:
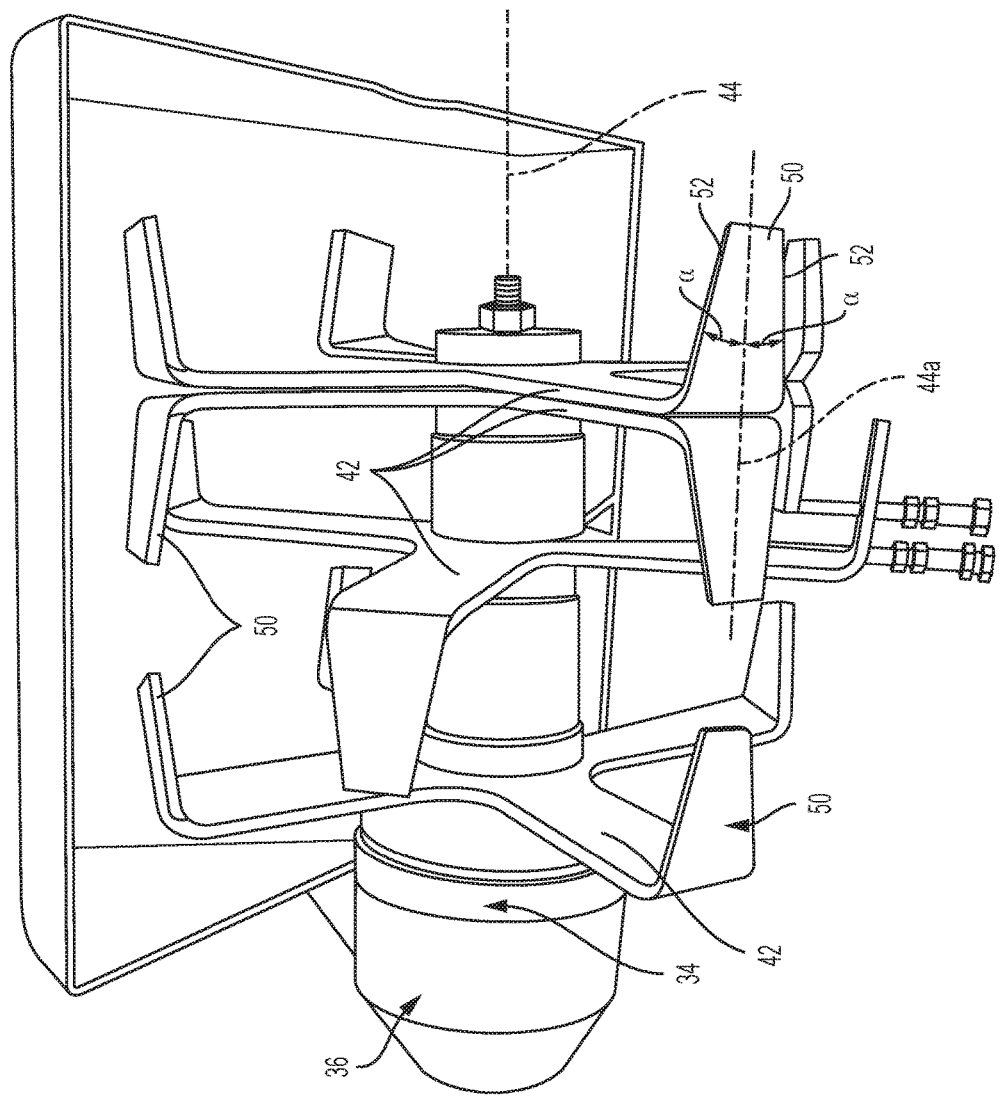
FIG. 15 is another close-up front elevational view of the gear unit, arms, tines, and shield of the carcass debris removal tool of FIG. 1.

The support for the carcasses to be cleaned is shown in FIGS. 13-14, where carcass trolleys 92, 92a, 92b, 92c, 92d, 92e, 92f may ride along the upper edge of carcass rail 90. Suspended beef carcasses 20, 20a, 20b, 20c to be cleaned and subsequently processed are shown hanging by hind legs 22 from hooks at the lower ends trolleys 92, 92a, 92b, 92c, 92d, 92e, 92f. The backbone or spine is shown in dotted line extending from the tail bone 23 at the base of the spine or backbone, at the upper end of the carcass. The beef carcass is oriented to present its underside, or whichever other side is to be cleaned, toward the dag remover 25.

As shown in FIG. 14, the cleaning station includes a pair of rails 100 on which ride a trolley 102 supporting dag removal tool 25 by cable 105. The trolley moves along the rail in a Z-direction normal to the X-direction of the carcass trolleys 92 along conveyor 90, toward and away from the carcass. The dag removal tool supported by the trolley is counterbalanced by mass 106 connected to the tool 25 by cable 105 passing through an overhead block. Counterweight mass 106 has a weight less than the weight of the tool to permit up or down movement of the tool by a force less than the weight of the tool. Mass 106 moves with tool 25 as the operator moves the tool toward and away from the beef carcass 20.

To clean the carcass, the desired side of the carcass 20 to be cleaned is presented toward the dag remover tool 25 and the operator grasps the tool handles and depresses the trigger(s) to commence rotation of the arm units. By balancing the tool at suspension point 38, the operator is provided with good control of the tool in front of him in order to position the head 34 as desired relative to the debris to be removed. The operator then maneuvers the tool toward the carcass on the trolley and angles, lifts, or lowers the rotating arms until the tines contact the animal carcass. The tines are then moved over the carcass until the desired amount of dag or other debris is removed. The carcass may be repositioned on the trolleys to present other sides and areas of the hide to the tool for cleaning. Once the debris has been sufficiently removed from the carcass, the operator releases the trigger(s). The tool does not contact the ground during use in cleaning the carcass.

If a tine edge becomes sufficiently worn, the tine may be swapped and rotated with another tine to present a new edge, or the entire tine is replaced. The configuration of the tines enables the debris to be removed efficiently, without damaging the hide of the carcass, which may be subsequently removed and used for other purposes.

The present invention thus provides one or more of the following advantages: 1) a tool and method for cleaning debris, including dag, from animal carcasses without damaging the hide; 2) a dag remover tool with a counterweight and suspension point to allow for easier operator control during operation of the tool, the suspension point preventing the tool from ever contacting the ground; 3) a dag remover tool with tines that allow for removal and replacement after enduring sufficient wear-and-tear; and 4) a shield and guard configuration that protects the operator from flying debris resulting from operation of the dag remover tool.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for removing solid debris from an animal carcass comprising:
    a body;
    at least one handle mounted to the body allowing the tool to be held away from a tool operator;
    a driver mounted in the body;
    a head having a shaft extending therefrom and rotatable by the driver;
    a plurality of arms extending from the shaft and having tines at distal ends thereof, the tines adapted to engage the animal carcass to remove solid debris from the hide, the head being oriented to permit movement of the arms and tines in front of the tool operator; and
    a suspension point for hanging the body from an overhead support to permit the operator to move the tool arms and tines toward and away from, and over different areas of, the animal carcass to remove solid debris therefrom without damaging the carcass hide.

2. The tool of claim 1 further including a shield at least partially surrounding the plurality of arms, the shield protecting the operator from impact with flying solid debris during engagement of the animal carcass with the tool arms and tines.

3. The tool of claim 1 wherein the arms extend radially outwardly from the shaft and the tines are disposed substantially normal to the arms and parallel to the shaft.

4. The tool of claim 1 wherein the arms include tine supports of one piece with the arms extending substantially normal thereto at the arm distal ends, and wherein the tines are secured to the tine supports.

5. The tool of claim 1 wherein the tines have opposite edges.

6. The tool of claim 4 wherein the tines are secured to the tine supports by a removable fastener, and are replaceable.

7. The tool of claim 1 wherein the tines have symmetric opposite edges and are removable from the arms, such that a tine on one arm may be removed and rotated and placed on another arm with the edges in opposite position.

8. The tool of claim 1 wherein the at least one handle has a trigger, such that depressing the trigger activates the driver and rotates the head.

9. The tool of claim 8 wherein a plurality of handles are mounted to the body, each handle having a trigger such that simultaneously depressing each trigger activates the driver and rotates the head.

10. A method of removing solid debris from an animal carcass comprising:

providing a tool having a body, and at least one handle having a trigger mounted to the body allowing the tool to be held away from a tool operator;
providing a driver mounted in the body;
providing a head having a shaft extending therefrom and rotatable by the driver;
providing a plurality of arms extending from the shaft and having tines at distal ends thereof, the tines adapted to engage the animal carcass to remove solid debris from the hide, the head being oriented to permit movement of the arms and tines in front of the tool operator; and
providing a suspension point for hanging the body from an overhead support to permit the operator to move the tool arms and tines toward and away from, and over different areas of, the animal carcass to remove solid debris therefrom without damaging the carcass hide;
suspending the tool by the suspension point from an overhead support;
grasping the handle by the operator and holding the tool away from the front of the operator;
depressing the trigger to commence rotation of the arms and tines; and
moving the tool arms and tines toward and away from, and over different areas of the animal carcass, such that the rotating tines contact the hide of the animal carcass to remove solid debris therefrom without damage thereto.

11. The method of claim 10 wherein the arms extend radially outwardly from the shaft and the tines are disposed substantially normal to the arms and parallel to the shaft.

12. The method of claim 10 wherein the arms include tine supports of one piece with the arms extending substantially normal thereto at the arm distal ends, and wherein the tines are secured to the tine supports.

13. The method of claim 10 wherein the tines have opposite edges and are replaceable.

14. The method of claim 10 wherein the tines have symmetric opposite edges and are removable from the arms, such that a tine on one arm may be removed and rotated and placed on another arm with the edges in opposite position.

15. The method of claim 10 wherein the tool does not contact the ground during use in cleaning of the animal carcass.

16. The method of claim 10 wherein a plurality of handles each having a trigger are mounted to the body, and further including depressing each trigger simultaneously to activate the driver and rotate the head.

17. A system for removing solid debris from an animal carcass comprising:
a cleaning station having a pair of rails on which rides a trolley for suspending an animal carcass;
a tool having a body;
at least one handle mounted to the body allowing the tool to be held away from a tool operator;
a driver mounted in the body;
a head having a shaft extending therefrom and rotatable by the driver;
a plurality of arms extending from the shaft and having tines at distal ends thereof, the tines adapted to engage the animal carcass to remove solid debris from the hide, the head being oriented to permit movement of the arms and tines in front of the tool operator; and
a suspension point for hanging the body from an overhead support to permit the operator to move the tool arms and tines toward and away from, and over different areas of, the animal carcass to remove solid debris therefrom without damaging the carcass hide;
wherein the operator may move the tool arms and tines toward the carcass suspended on the trolley as the trolley and carcass rides along the rails, the rotating head moving the arms and tines in an arc to make contact with and remove solid debris from the carcass, and the operator may move the tool arms and tines away from the carcass once the solid debris are removed from the carcass.

18. The system of claim 17 further including a shield at least partially surrounding the plurality of arms, the shield capable of protecting the operator from impact with flying solid debris during engagement of the animal carcass with the tool arms and tines.

19. The system of claim 17 wherein the arms extend radially outwardly from the shaft and the tines are disposed substantially normal to the arms and parallel to the shaft.

20. The system of claim 17 wherein the arms include tine supports of one piece with the arms extending substantially normal thereto at the arm distal ends, and wherein the tines are secured to the tine supports.

21. The system of claim 17 wherein the tines have opposite edges and are replaceable.

22. The system of claim 17 wherein the tines have symmetric opposite edges and are removable from the arms, such that a tine on one arm may be removed and rotated and placed on another arm with the edges in opposite position.

23. The system of claim 17 wherein the tool does not contact the ground during use in cleaning of the animal carcass.

24. The system of claim 17 wherein the at least one handle has a trigger, such that depressing the trigger activates the driver and rotates the head.

25. The system of claim 24 wherein a plurality of handles are mounted to the body, each handle having a trigger such that simultaneously depressing each trigger activates the driver and rotates the head.

* * * * *